Figure 1:
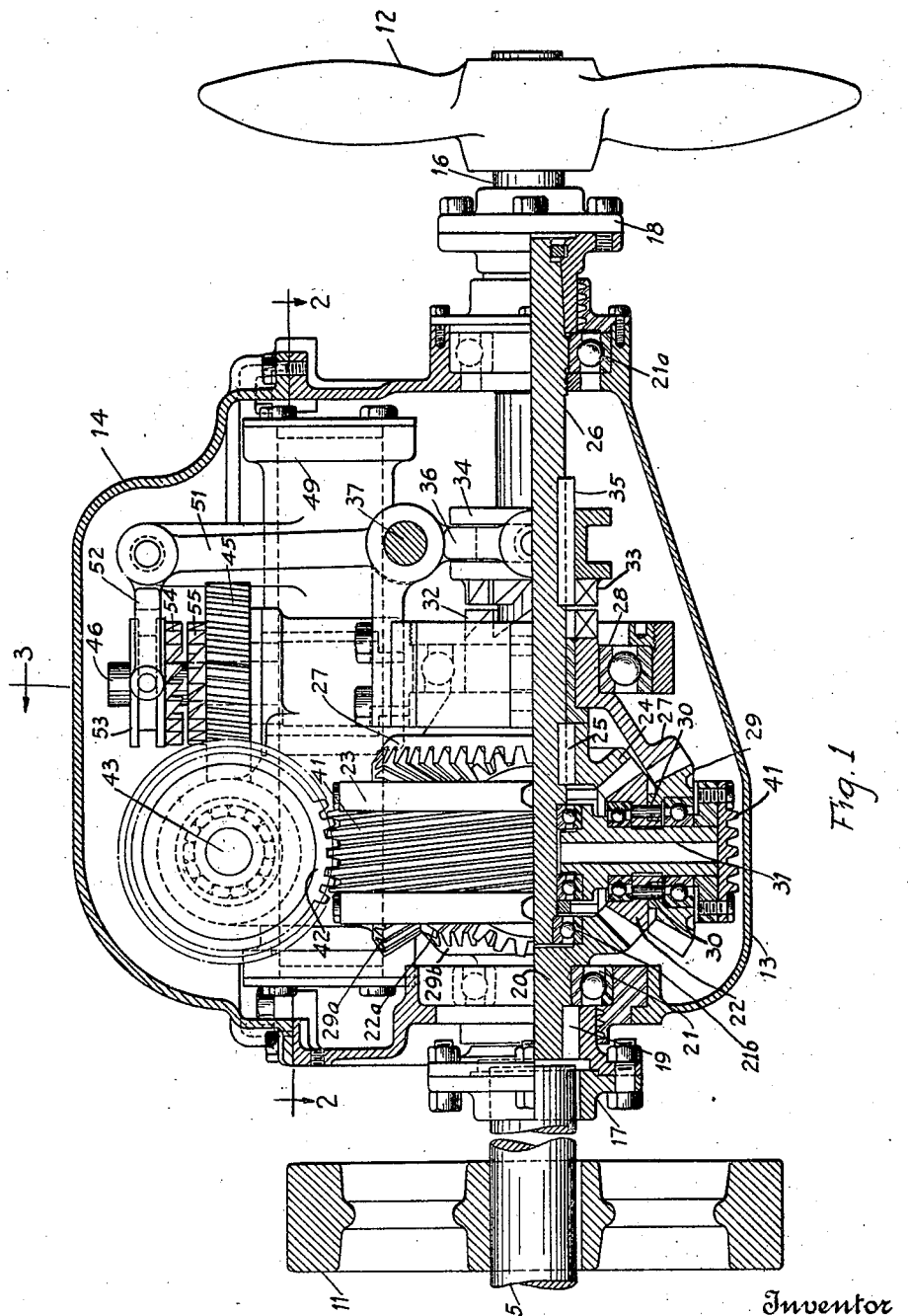

Jan. 30, 1923.

W. L. KERLIN.
REVERSING GEAR.
FILED OCT. 7, 1920.

1,443,790.

3 SHEETS—SHEET 1.

Inventor
William L. Kerlin
By his Attorney

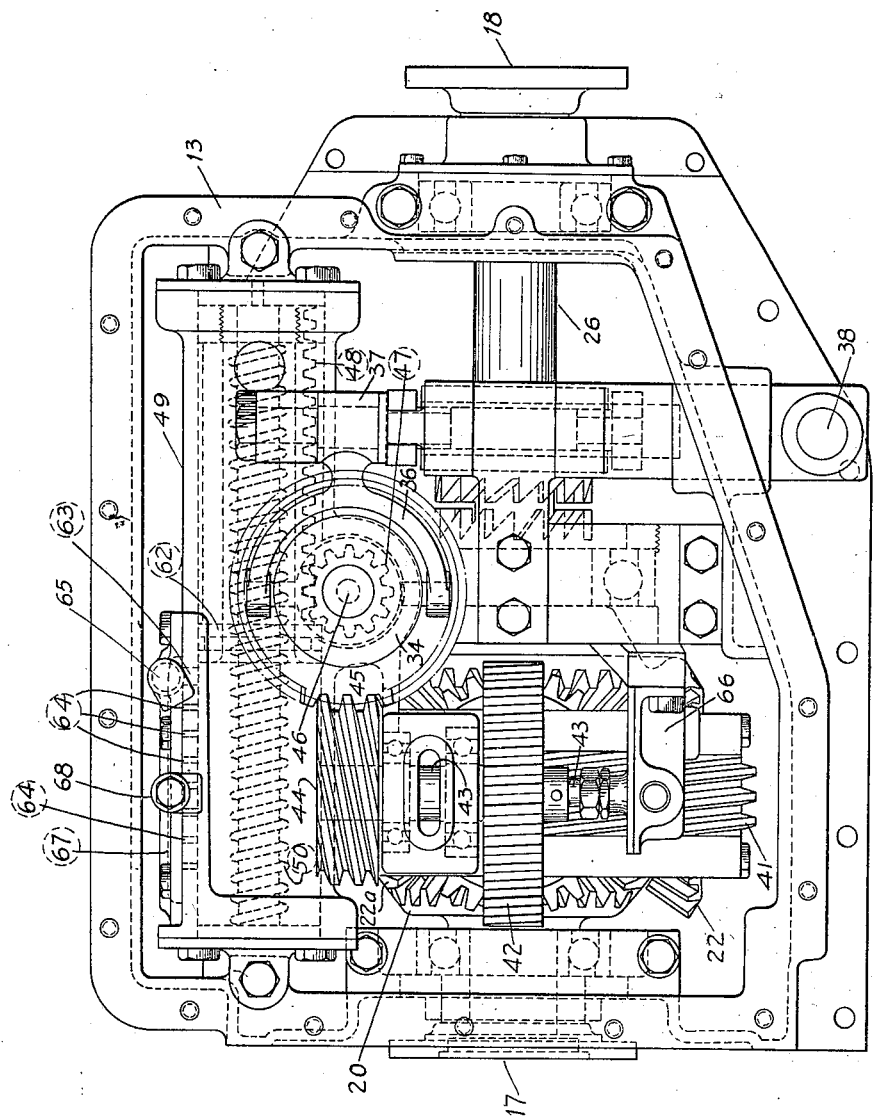

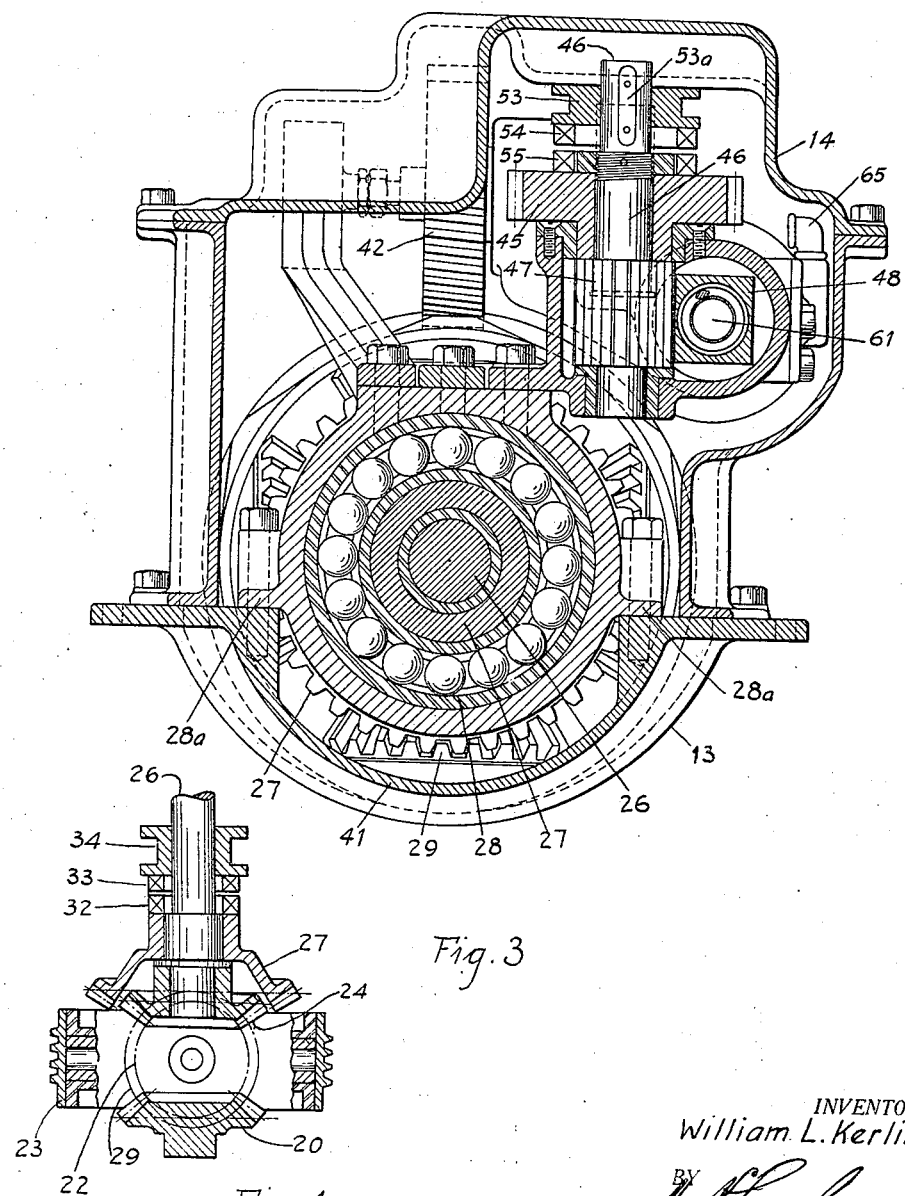

Patented Jan. 30, 1923.

1,443,790

UNITED STATES PATENT OFFICE.

WILLIAM L. KERLIN, OF NEW YORK, N. Y.

REVERSING GEAR.

Application filed October 7, 1920. Serial No. 415,259.

*To all whom it may concern:*

Be it known that I, WILLIAM L. KERLIN, a citizen of the United States, and resident of New York, in the county of New York and State of New York, have invented certain new and useful Improvements in Reversing Gears, of which the following is a specification.

This invention relates to reversing gears such as may be used between power shafts and driven shafts for propellers, machine tools, winches and the like, and includes means for securing a one-to-one direct or reverse drive which is positive in action, reliable in operation and that can be applied to shafts transmitting considerable power when running at high speeds as well as at low speeds. This invention includes means for absorbing the jar to the mechanism when the direction of the drive is changed and certain novel features for locking the elements of the mechanism which are adapted for high speed running in the normal and reverse direction. This invention also includes certain novel features in construction and arrangement of parts as will be more particularly understood from the following specification and drawings in which, Fig. 1 is a side elevation of a reversing gear including this invention with the mechanism case and certain parts shown in section; Fig. 2 is a plan view taken on line 2—2 of Fig. 1, with the cover removed. Fig. 3 is a sectional elevation taken on line 3—3 of Fig. 1, showing certain of the working parts in section, and Fig. 4 is a sectional diagram of the gear arrangement to show the operation of the mechanism.

The construction of this invention includes a differential gear with certain added parts including a clutch mechanism so constructed that there is comparatively little difference in the speed of the clutch members before they engage, also, a retarding mechanism is brought into action to absorb the momentum of the rotating parts before the mechanism is positively engaged for a one-to-one drive. The power shaft has the usual bevel gear of the differential secured thereon and through the spider member drives the corresponding bevel on the end of the driven shaft. When the spider or planetary member is held stationary, this provides a one-to-one reverse drive; when it is locked to rotate with either the driven or power shaft, a one-to-one direct drive is secured. This locking is provided for by an independent bevel gear loosely mounted on the driven shaft and rotated in a direction opposite to the direction of the power shaft by the spider member at a much lower speed than the speed of the power shaft; a clutch mechanism locks this bevel gear to rotate integral with the driven shaft and the angular displacement caused thereby locks the planetary member to rotate with the driven shaft thus providing a one-to-one direct drive.

Referring to the drawings, 11 represents the fly-wheel of an engine or other source of power mounted on the power shaft 15 and 12 represents a propeller for a motor boat or other application connected to the driven shaft 16, which is located on the same axial plane as the power shaft 15. 13 is the frame of the mechanism which is secured to a suitable foundation and 14 is a detachable cover. The shaft 15 is secured by a flange 17 and key 19 to the hub of the bevel gear 20 rotating on the ball bearing 21. The driven shaft 16 is also secured to the flange 18 which, in turn, is secured integral with shaft 26 rotating on the ball bearing $21^a$. The inner end of driven shaft 26 has keyed thereon bevel gear 24 by key 25, and the extreme end of driven shaft 26 is supported by the ball bearing $21^b$ in the bevel gear 20. The spider or planetary element 23 of the differential mechanism supports the bevel gears 22 and $22^a$, also bevel gears $22^b$ and $22^c$ placed at right angles to 22 and $22^a$ but not shown in Fig. 1. These gears are free to rotate on a shaft 31 mounted on ball bearings in the spider member and engage the bevel gears 20 and 24 thereby connecting the power shaft and the driven shaft in a manner well understood in the usual type of differential mechanism.

Secured to rotate on the same axis 31 as the gears 22, $22^a$, $22^b$ and $22^c$, the bevel gears 29, $29^a$ and $29^b$, also the bevel gear $29^c$, (not shown) are located and rigidly connected to the former by pins 30 shown in the sectional view in Fig. 1. Gear 29 therefore rotates at the same rate of speed as gear 22 but is larger in diameter and a corresponding relation is maintained between the other gears. On the side of the differential mechanism where the driven shaft leads off, the clutch gear 27 is provided arranged to engage gears 29, 29ª, 29ᵇ and 29ᶜ. Since gears 29, 29ª, etc., are larger in diameter than gears 22, 22ª, etc., and rotating at the same speed, the result is that clutch gear 27 tends to turn at a different speed from shaft 26 which is driven through gears 22, 22ª, etc., in a manner hereafter explained in connection with the operation of the system. This gear is mounted to rotate loosely on a collar on shaft 26 and is supported by the ball bearing ring 28, best shown in Fig. 3. This ring is provided with supporting brackets 28ª secured to the mechanism case as shown.

The hub of gear 27 is provided with a dental or toothed clutch 32 arranged to be engaged by the teeth 33 of clutch ring 34, splined on shaft 26 by the spline 35 and operated by the fork 36 pivoted in shaft 37 which is manipulated by lever 28 from the outside of the mechanism. The clutch gear 27 is rotated at a low speed compared with the speed of the power shaft due to the gear reduction in the differential mechanism. This makes the use of a dental clutch possible for high speeds and insures smooth operation when clutching and declutching.

The spider or planetary element 23 has provided on its perimeter the helical thread 41 arranged to engage the worm wheel 42 supported on shaft 43, Fig. 2 to which the worm 44 is secured. This worm engages worm wheel 45 loosely mounted on shaft 46 and containing the dental clutch 55 Fig. 1, positioned to engage the teeth 54 of the clutch member 53 splined to shaft 46 by spline 53ª, Fig. 3. This clutch member is controlled by the clutch lever 52, secured to lever 51, pivoted to shaft 37 as before described.

Shaft 46 has mounted thereon the spur gear 47 engaging the rack teeth 48 through an aperture in the cylinder 49 thereby moving piston 62 against the action of spring 50 and the resistance of oil in the cylinder which is discharged as the piston moves forward. The wall of the cylinder is provided with a number of openings to regulate the escape of the oil and thereby introduce a graduated resistance to the movement of the piston. These openings are indicated by 64 and lead into a chamber below the cover 67 indicated by the dotted line. As the piston 62 moves forward the number of these openings through which the oil may escape is reduced and the motion of the piston is thereby retarded. This provides a graduated resistance to the rotation of shaft 46 which, when the clutch member 53 engages the worm wheel 45 introduces a retarding effect against the rotation of the planetary member 23 and when the piston has moved to the extreme end of its stroke the planetary member is locked against rotation. This graduated resistance applied to oppose the rotation of the planetary member causes an acceleration of the driven shaft until, finally, when the planetary member is stopped, the driven shaft has accelerated to the full speed of the power shaft. The oil escaping into the space below the cover 67 under pressure of the piston 62, finally escapes into the interior of the mechanism case through an adjustable opening at 68, the size of which may be varied by a screw and the oil is returned to this space by oil pump 66 which has a pipe connection (not shown) to elbow 65 and through the large opening 63 to the cylinder. When the clutch 53 is released, shaft 46 is free to rotate and spring 50 restores the piston to the starting position.

It will be noted that the speed of worm wheel 34 driven through the double set of worm gears is comparatively slow even when the planetary member is rotating at high speed. This permits the use of a dental clutch and secures smooth operation of the clutching members at all speeds.

The operation of this invention will be understood by considering the driven shaft at rest and the power shaft rotating, in this case the clutch lever is in the position shown in Fig. 1, that is, both clutches are released. The planetary member being free to rotate, the bevel gears 22, 22ª, etc., driven by the power shaft ride freely on the bevel gear 24 without rotating this gear as the rotation of the planetary member counteracts the rotation of gears 22, 22ª, etc., there is therefore no torque applied to shaft 26 except such as arises from the frictional resistance to the rotation of the planetary member.

With the driven shaft at rest and the power shaft rotating it is apparent that gears 29, 29ª, etc., rotate and ride upon clutch gear 27. These gears however, tend to drive the clutch gear at a slightly higher speed than gear 22, 22ª, etc., tend to drive gear 24 with the result that clutch gear 27 is rotated in the reverse direction to the power shaft and at a very much lower speed so that the dental clutch can be brought into operation at any time. When the clutch 34 is brought into operation, causing the driven shaft to move integral with the clutch gear 27 and gear 24, there is an unequal torque applied to the bevel gears 22 and 29 due to gear 27 tending to cause bevel gear 22 to move faster than gear 24, causes this gear to move and as gears 22 and 29 are rigidly connected this causes a locking effect between the teeth of these gears and thereby locks the planetary member to rotate with the power shaft and the driven shaft, thus providing a one-to-one direct drive. For reverse running, clutch 34 is released and clutch 35 is brought into action. This causes shaft 46 to move integral with worm wheel 45 driven by the planetary member. This piston is moved slowly forward in cylinder 49, closing intake orifice 63 and closing the openings 64 as the piston progresses until it comes to a stop at the end of the stroke. Oil in the cylinder is forced out through these openings into the casing at a gradually reduced rate until the piston is finally stopped. This introduces a gradual retarding effect to the planetary member during which time shaft 26 comes to rest and accelerates in the reverse direction until it is running at the same speed as the power shaft. This absorbs the momentum of the driven shaft and insures smooth operation of the mechanism.

Having thus described my invention, I claim:

1. In a mechanism of the class described, in combination, a power shaft and a driven shaft, a planetary member connecting said shafts, a gear driven by said planetary member and loosely rotating upon one of said shafts and means for locking said planetary member to rotate with said shafts through said gear.

2. In a mechanism of the class described, in combination, a power shaft and a driven shaft, a planetary member connecting said shafts, a gear driven by said planetary member and loosely rotating upon one of said shafts and means for locking said gear to rotate integral with said shaft.

3. In a mechanism of the class described, in combination, a power shaft and a driven shaft, a planetary member connecting said shafts, a gear loosely mounted upon one of said shafts and driven by said planetary member at a speed different from the speed of said shaft and means for locking said gear integral with said shaft.

4. In a mechanism of the class described, in combination, a power shaft and a driven shaft, a planetary member connecting said shafts, a gear driven by said planetary member and loosely rotating upon one of said shafts and a dental clutch for locking said gear to rotate integral with said shaft.

5. In a mechanism of the class described, in combination, a power shaft and a driven shaft, a planetary member connecting said shafts, a gear connected with said planetary member rotating loosely upon said driven shaft at a comparatively low speed relative to said power shaft and a dental clutch for locking said gear to said shaft.

6. In a mechanism of the class described, in combination, a power shaft and a driven shaft, a planetary member embodying a first set of bevel gears connecting said shafts, a second set of bevel gears moving integral with said first set of bevel gears and a gear loosely mounted on said driven shaft engaging said second set of bevel gears and means for locking said gear integral with said driven shaft whereby said driven shaft is rotated in the same direction as said power shaft.

7. In a mechanism of the class described, in combination, a power shaft and a driven shaft, a planetary member embodying a first set of bevel gears connecting said shafts, a second set of bevel gears moving integral with said first set of bevel gears, a gear loosely mounted on one of said shafts engaging said second set of bevel gears and a clutch mechanism for locking said gear to rotate integral with said shaft.

8. In a mechanism of the class described, in combination, a power shaft and a driven shaft, a planetary member embodying bevel gears of different sizes moving integral with each other, one of said bevel gears connecting said shafts, a clutch gear loosely mounted on one of said shafts engaging the other bevel gear and means for locking said clutch gear integral with said shaft.

9. In a mechanism of the class described, in combination, a power shaft and a driven shaft, a planetary member embodying a plurality of bevel gears of different sizes moving integral with each other, one of said bevel gears connecting said shafts, a clutch gear loosely mounted on said driven shaft and engaging the other of said bevel gears and means for locking said clutch gear to said driven shaft.

10. In a mechanism of the class described, in combination, a power shaft and a driven shaft, a planetary member embodying a plurality of bevel gears moving integral with each other, one of said bevel bears connecting said shafts, a clutch gear loosely mounted on said driven shaft and engaging the other of said bevel gears and driven at a speed different from said driven shaft and means for locking said clutch gear integral with said driven shaft whereby said planetary member is locked to rotate with said shafts.

11. In a mechanism of the class described, in combination, a power shaft and a driven shaft, a planetary member connecting said shafts, a retarding mechanism including a worm gear connected with said planetary member and arranged to operate said retarding mechanism.

12. In a mechanism of the class described, in combination, a power shaft and a driven shaft, a planetary member connecting said shafts, a mechanism including a reduction gearing retarding the movement of said planetary member, said reduction gearing operating said retarding mechanism.

13. In a mechanism of the class described, in combination, a power shaft and a driven shaft, a planetary member connecting said shafts, a mechanism including a clutch retarding the movement of said planetary member and means for connecting said retarding mechanism with said planetary member.

14. In a mechanism of the class described, in combination, a power shaft and a driven shaft, a planetary member connecting said shafts, a mechanism including a clutch retarding the movement of said planetary member, means for connecting said retarding mechanism with said planetary member by said clutch and means whereby said clutch members move at a slow speed relative to each other compared with the speed of said planetary member.

15. In a mechanism of the class described, in combination, a power shaft and a driven shaft, a planetary member connecting said shafts, a mechanism including means for connecting with said planetary member and means for restoring said member to the starting position when released from said planetary member, said mechanism retarding the movement of said planetary member.

16. In a mechanism of the class described, in combination, a power shaft and a driven shaft, a planetary member connecting said shafts, including a spring and a clutch, means for connecting said retarding mechanism with said planetary member by said clutch and means for restoring said mechanism to the starting position by said spring when said clutch is released.

17. In a mechanism of the class described, in combination, a power shaft and a driven shaft, a planetary member connecting said shafts, said planetary member having a spiral thread in the periphery thereof, a worm gear engaging said thread, a cylinder filled with fluid and having a piston, said worm gear moving the piston in said cylinder to force said fluid through a restricted opening, thereby retarding rotation of said planetary member.

18. In a mechanism of the class described, in combination, a power shaft and a driven shaft, a planetary member connecting said shafts, a cylinder filled with fluid, a piston for said cylinder moved by said planetary member, a plurality of openings for said oil in said cylinder, the number of openings for the escape of said oil from said cylinder being reduced as said piston moves forward whereby a graduated retarding effect is applied to the movement of said planetary member.

19. In a mechanism of the class described, in combination, a power shaft and a driven shaft, a planetary member connecting said shafts, a cylinder having a piston, a reducing gearing connecting said piston with said planetary member whereby said piston moves at a comparatively slow speed as compared with said planetary member, and means for introducing a graduated retarding effect to said piston as it moves forward in said cylinder.

20. In a mechanism of the class described, in combination, a power shaft and a driven shaft, a planetary member connecting said shafts said member including a worm gear, means for locking said planetary member to rotate with said shafts for a direct drive and means including said worm gear for locking said planetary member against rotation for a reverse drive.

21. In a mechanism of the class described, in combination, a power shaft and a driven shaft, a planetary member connecting said shafts and including an independent gear associated with one of said shafts and operatively connected with said planetary member, means including said gear for locking said planetary member to rotate with said shafts for a direct drive and means for locking said planetary member against rotation for a reverse drive.

Signed at New York in the county of New York and State of New York this 6th day of October A. D. 1920.

WILLIAM L. KERLIN.